United States Patent Office 3,520,744
Patented July 14, 1970

3,520,744
FREE-RUNNING PENTAERYTHRITOLTETRA-NITRATE AND PROCESS OF PREPARING SAME
Hugh Thomas, Irvine, and John Turbet, Saltcoats, Scotland, assignors to Imperial Chemical Industries Limited, London, England, a corporation of Great Britain
No Drawing. Filed Feb. 27, 1969, Ser. No. 803,063
Claims priority, application Great Britain, Mar. 4, 1968, 10,287/68
Int. Cl. C06b 3/00
U.S. Cl. 149—93     8 Claims

ABSTRACT OF THE DISCLOSURE

The invention relates to pentaerythritol tetranitrate (PETN) having improved free-running character and to a process for the production of free-running PETN. The free-running PETN is produced by co-precipitation with di-pentaerythritol hexanitrate.

PETN is a highly explosive compound which in fine crystalline form is commonly used as the core of detonating fuse-cord. In the manufacture of the cord the PETN must flow continuously and uniformly through a small diameter die and must, therefore, be very free-running. The PETN normally used is crystallised by precipitation from a solution by dilution of the solvent with water and, when the PETN is substantially pure, the crystals are elongated and have rather poor free-running characteristics. When the PETN contains a proportion of residual impurities from its manufacture, it has notably superior free-running qualities and it has therefore become the practice to manufacture PETN from somewhat impure pentaerythritol. The amount of impurity present in the finally crystallised PETN varies excessively and it is necessary to blend several batches to obtain adequate free-running properties without undue waste.

It is an object of this invention to provide PETN having uniformly good free-running properties without needing to blend batches.

In accordance with this invention free-running PETN comprises crystals of PETN modified by co-precipitation with di-pentaerythritol hexanitrate (di-PEHN). Preferably the modified PETN crystals contains 0.1 to 0.5% by weight of di-PEHN.

Also in accordance with the invention the process for the production of free-running PETN comprises co-precipitating PETN and di-PEHN from a common solvent. The preferred solvent comprises acetone.

In a preferred process the PETN and di-PEHN are dissolved and the solvent is thereafter diluted with a non-solvent for the PETN and di-PEHN, for example water, to precipitate PETN and di-PEHN. Preferably the di-PEHN dissolved constitutes 0.1 to 0.5% by weight of the total weight of PETN and di-PEHN, and the PETN preferably has a purity of at least 99.9% by weight.

The PETN and di-PEHN may be readily prepared in known manner by the nitration of pentaerythritol and di-pentaerythritol respectively.

The invention is further illustrated by the following examples in which all parts and percentages are by weight.

EXAMPLES 1-11

In these examples 900 parts of water-wet PETN (>99.9% pure), containing 108 parts of water, and an appropriate amount of di-PEHN to give the concentration of di-PEHN given in the following table, were mixed and placed in an extraction vessel. A precipitation vessel was charged with 1860 parts of 40% aqueous acetone and 11 parts of sodium carbonate which were stirred and heated to 68 to 70° C. to evaporate acetone which was condensed and allowed to flow as a continuous stream into the extraction vessel where it dissolved PETN and di-PEHN. The temperature of the contents of the extraction vessel was maintained at 50° C. The solution of PETN and di-PEHN was allowed to flow continuously from the extraction vessel to the precipitation vessel where the dissolved solids were co-precipitated in crystalline form. The crystals from Examples 2 and 4–9 containing di-PEHN were round and appeared to be agglomerates of fine crystals, whilst those from Examples 1 and 3, which are included for comparison, were elongated discrete crystals.

The bulk density measurements given in the table were measured by pouring 100 g. of the dry material loosely into a 2.0 mm. diameter funnel. The free-running test measurement is the rate of flow through a 0.2 mm. diameter orifice at the bottom of a 60° test funnel.

TABLE

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| | PETN sample | | | | | | | | | | |
| | A | A | B | B | B | B | B | B | B | B | B |
| Percent di-PEHN | | 0.25 | | 0.10 | 0.175 | 0.20 | 0.225 | 0.25 | 0.30 | 0.4 | 0.50 |
| Particle size (percent passing): | | | | | | | | | | | |
| 36 BSS | 99.6 | 96.4 | 100.0 | 99.8 | 99.5 | 97.8 | 98.0 | 100.0 | 99.4 | 88.0 | 80.2 |
| 52 BSS | 99.4 | 78.0 | 100.0 | 99.4 | 99.2 | 50.6 | 98.0 | 78.0 | 61.4 | 77.0 | |
| 72 BSS | 95.6 | 44.8 | 96.8 | 42.4 | 33.8 | 19.8 | 35.5 | 44.0 | 16.6 | 29.0 | 13.2 |
| 100 BSS | 55.4 | 15.4 | 48.0 | 16.0 | 10.4 | 4.0 | 12.0 | 10.0 | 6.6 | 6.0 | 4.2 |
| Bulk density, g./cc | 0.70 | 0.86 | 0.72 | 0.77 | 0.82 | 0.91 | 0.91 | 0.85 | 0.88 | 0.96 | 0.89 |
| Free-running test, g./min | Non-flow | 123.8 | Non-flow | Non-flow | 80.0 | 126.1 | 126.0 | 120.7 | 133.6 | 143 | 111.1 |

What we claim is:

1. Free-running pentaerythritol tetranitrate crystals, which crystals consist essentially of pentaerythritol tetranitrate modified by co-precipitation with di-pentaerythritol hexanitrate.

2. Free-running pentaerythritol tetranitrate as claimed in claim 1 containing 0.1 to 0.5% by weight of di-pentaerythritol hexanitrate.

3. A process for the production of free-running pentaerythritol tetranitrate which comprises forming a solution consisting essentially of pentaerythritol tetranitrate and di-pentaerythritol hexanitrate in a common solvent and co-precipitating pentaerythritol tetranitrate and di-pentaerythritol hexanitrate from said common solvent.

4. A process as claimed in claim 3 wherein the solvent comprises acetone.

5. A process as claimed in claim 3 wherein the solvent is diluted with a non-solvent for the pentaerythritol tetranitrate and di-pentaerythritol hexanitrate to precipitate pentaerythritol tetranitrate and di-pentaerythritol hexanitrate.

6. A process as claimed in claim 5 wherein the non-solvent comprises water.

7. A process as claimed in claim 3 wherein the di-pentaerythritol hexanitrate constitutes 0.1 to 0.5% by weight of the total weight of pentaerythritol tetranitrate and di-pentaerythritol hexanitrate.

8. A process as claimed in claim 3 wherein the pentaerythritol tetranitrate has a purity of at least 99.9% by weight.

References Cited

UNITED STATES PATENTS

| 2,407,805 | 9/1946 | Wyler | 149—93 X |
| 2,867,647 | 1/1959 | Gow et al. | 149—93 X |

BENJAMIN R. PADGETT, Primary Examiner

S. J. LECHERT, JR., Assistant Examiner

U.S. Cl. X.R.

260—467